No. 661,719. Patented Nov. 13, 1900.
L. H. HAYNES.
RECTIFIER OF ALTERNATING POLYPHASE CURRENTS.
(Application filed Dec. 30, 1899.)
(No Model.)
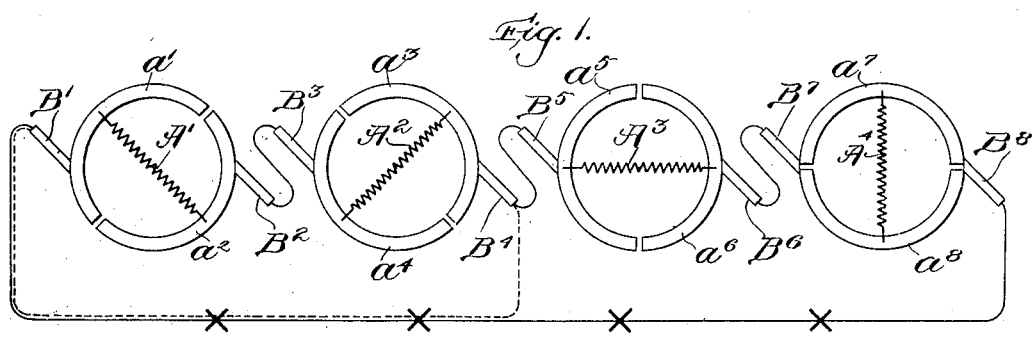
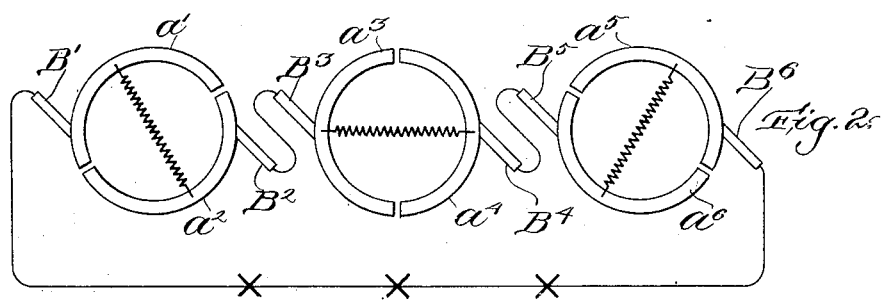
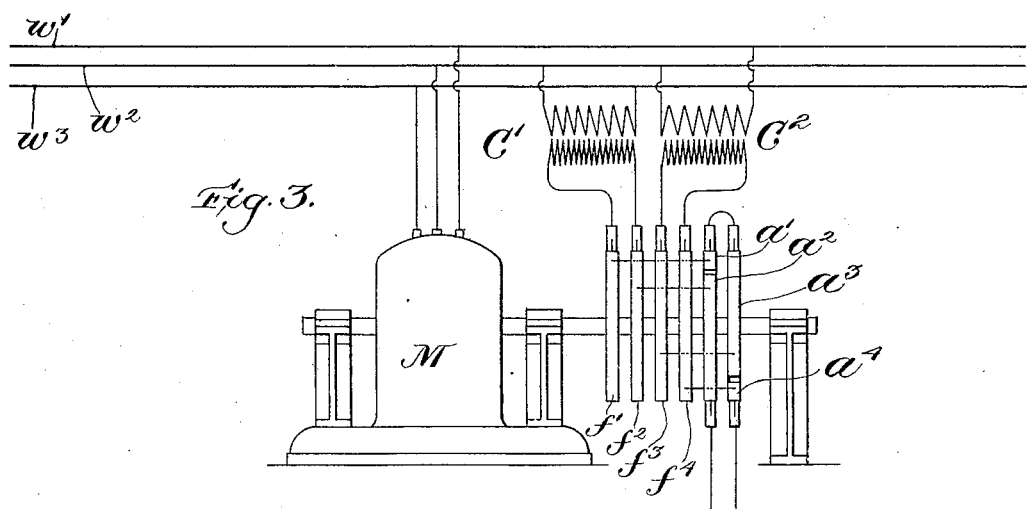
Witnesses:
Arthur D. Randall
C. B. Maynadier
Inventor:
Louis Henry Haynes.
by J. E. Maynadier
Attorney.

UNITED STATES PATENT OFFICE.

LOUIS HENRY HAYNES, OF NEWTON, MASSACHUSETTS.

RECTIFIER OF ALTERNATING POLYPHASE CURRENTS.

SPECIFICATION forming part of Letters Patent No. 661,719, dated November 13, 1900.

Application filed December 30, 1899. Serial No. 742,073. (No model.)

*To all whom it may concern:*

Be it known that I, LOUIS HENRY HAYNES, of Newton, in the county of Middlesex and State of Massachusetts, have invented a new and useful Rectifier of Alternating Polyphase Currents, of which the following is a specification, reference being had to the accompanying drawings, in which—

Figure 1 is a diagram explanatory of my rectifier when used with two-phase currents and also with four-phase currents. Fig. 2 is a like diagram, but with three-phase currents. Fig. 3 is a diagram illustrating my invention.

My invention is the combination of a plurality of pairs of collector-rings, one pair for each phase of a polyphase current with at least one commutator-segment for each collector-ring, all the collector-rings and segments being actuated by a motor.

The wires $w'$ $w^2$ $w^3$ are conductors of a two-phase alternating current, such as is now in common use, and these wires supply a two-phase current to the synchronous motor M. The shaft of the motor carries four collecting-rings $f'$ $f^2$ $f^3$ $f^4$, one of which, $f'$, is one terminal of the secondary of converter $C'$, the other, $f^2$, the other terminal of that secondary, and the third, $f^3$, and fourth, $f^4$, are the terminals of the secondary of converter $C^2$. Ring $f'$ connects with segment $a'$, ring $f^2$ with segment $a^2$, ring $f^3$ with segment $a^3$, and ring $f^4$ with segment $a^4$, and consequently the electromotive force of each segment is always the same as the electromotive force of its ring; but the total electromotive force of the circuit supplied by the segments is the sum of the electromotive force of the four segments, and if the voltage of wires $w'$ $w^2$ $w^3$ be, say, one thousand and the transformer convert that into two thousand the voltage of the working circuit will be over three thousand. If the wires $w'$ $w^2$ $w^3$ carried a three-phase current, there would be six rings on the shaft of the synchronous motor, and three commutators would be necessary, as illustrated in Fig. 2, which will be plain without further explanation.

Obviously the conversion of a polyphase current into a direct current, or vice versa, involves some waste of energy; but the efficiency of my apparatus is very high and its advantages much more than compensate for the slight waste of energy.

What I claim as my invention is—

The combination of a plurality of pairs of collector-rings, one pair for each phase of a polyphase current; at least one commutator segment for each collector-ring; a motor operating the rings and commutators; brushes for the collector-rings; and brushes for the commutators, all substantially as set forth.

LOUIS HENRY HAYNES.

Witnesses:
J. E. MAYNADIER,
C. B. MAYNADIER.